Aug. 27, 1929.  J. B. HAMBLEN  1,726,296
TANK GAUGE
Filed May 13, 1927
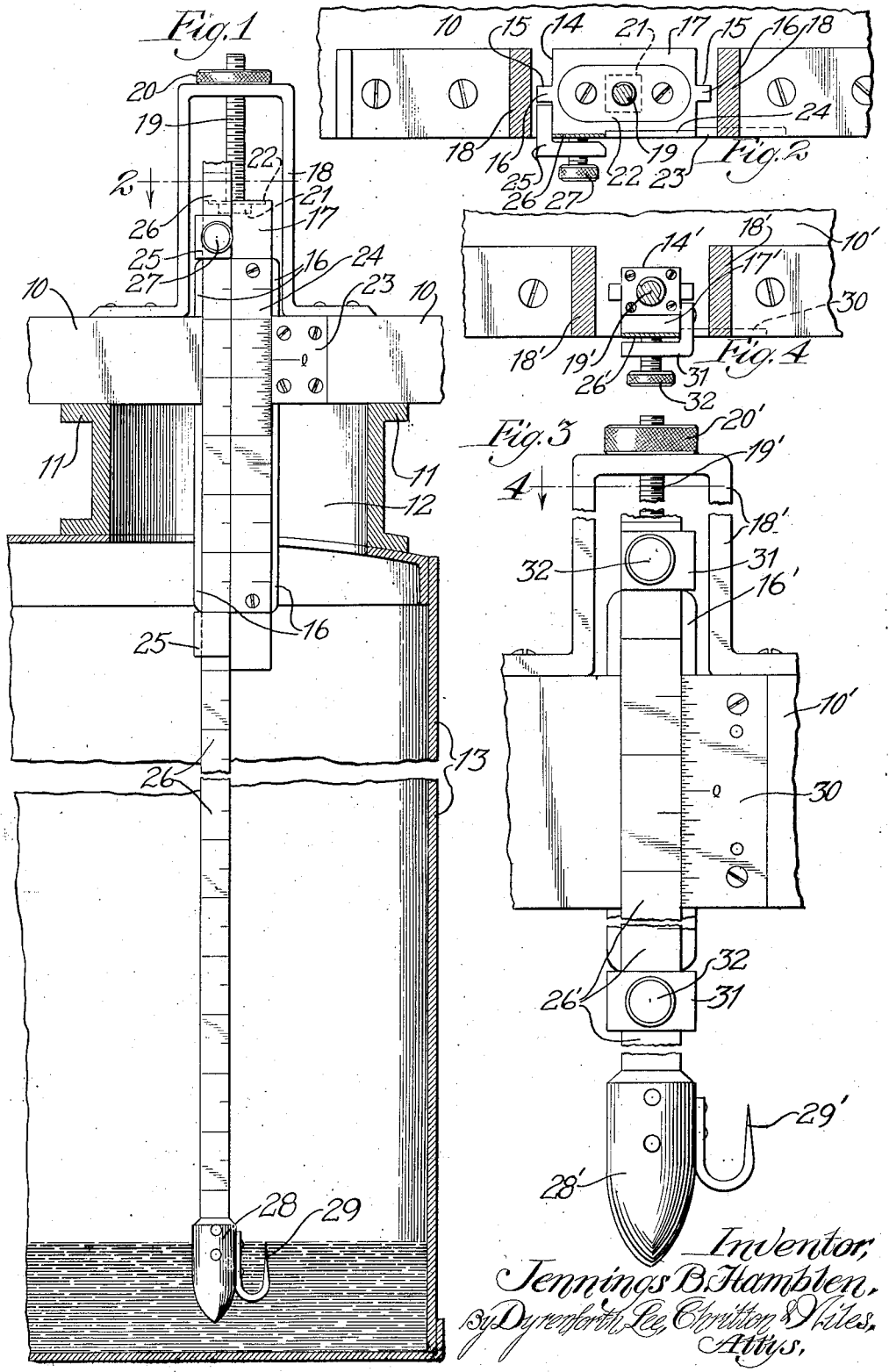
Inventor
Jennings B. Hamblen,
by Dyrenforth, Lee, Chritton & Wiles,
Attys.

Patented Aug. 27 1929

1,726,296

UNITED STATES PATENT OFFICE.

JENNINGS B. HAMBLEN, OF WHITING, INDIANA, ASSIGNOR TO STANDARD OIL COMPANY, OF WHITING, INDIANA, A CORPORATION OF INDIANA.

TANK GAUGE

Application filed May 13, 1927. Serial No. 191,134.

This invention relates to tank gauges and particularly to gauges for accurately determining changes in level of liquid in tanks due to evaporation and wastage.

The invention will readily be understood from the following description of preferred embodiments thereof in conjunction with the accompanying drawings, in which:

Figure 1 is a sectional diagrammatic view of an oil tank and an elevational view of the gauge in operative position thereon;

Fig. 2 is a sectional plan on the line 2—2 of Fig. 1;

Fig. 3 is an elevational view of a modified form of gauge, parts thereof being broken away; and Fig. 4 is a sectional plan view on the line 4—4 of Fig. 3.

Referring to the modification shown in Figs. 1 and 2, 10 is a horizontal bar which is adapted to rest upon a flange 11 of a thief-hole 12 or other opening in the roof of a tank 13. The front side of the bar 10 is recessed as shown at 14, the recess being provided with vertical grooves 15 adapted to receive slides 16 of a member 17 located in the recess 14, so as to slide up and down therein.

Over the sliding member 17 is provided a supporting member 18 of the shape of an inverted U. The member 18, which may suitably be constituted by a bent strip of metal, is attached to the upper surface of the bar 10 on either side of the sliding member 17. Immediately above the sliding member 17, the member 18 is perforated for the passage of a threaded stem 19 provided with a thumb nut 20 which is adapted to bear upon the upper surface of the member 18. The stem 19 is provided with a square head 21 located in a recess in the top of the member 17 and retained therein by a superimposed metal plate 22.

On the bar 10 adjacent to the sliding member 17, is mounted a stationary scale 23 having a fixed mark thereon. On the slide member 17 and adjacent to the scale 23 is mounted a short scale 24 which is graduated very finely and accurately, for example, to a sixty-fourth of an inch. The finely graduated side of the scale 24 is located adjacent the scale 23. The slide member 17 also carries guide members 25 adapted to receive a steel tape 26 and hold it alongside the scale 24. A thumbscrew 27 is provided for the purpose of clamping the steel tape to the slide member 17, so as to position it alongside the scale 24. The tape 26 may only be provided with major graduation marks, for example, inch marks. The major graduations of the scale 24 extend across the scale so that the major graduations of the tape and scale 24 may be brought into accurate register. At its lower end the steel tape is provided with a bob 28 and a hook 29 terminating in a sharp upturned point.

The operation is as follows: The device is placed in operative position as shown in Fig. 1, the thumbscrew 27 is loosened and the steel tape lowered into the tank until the hook 29 is completely immersed. The steel tape is further lowered until the inch marks thereon correspond accurately with the inch marks on scale 24 whereupon the thumbscrew 27 is tightened to clamp the tape 26 in that position. The thumbscrew 20 is now rotated to elevate the tape 26 until the point of the hook 29 just touches the surface of the liquid. This adjustment can be effected with great accuracy and the distance from the level of the liquid to the mark on the scale 23 can be read to the nearest one hundred twenty-eighth of an inch.

The provision of the bob 28 at the end of the tape 26 enables the depth of the liquid to be read in the usual manner, that is, by passing the tape in until the bottom is touched, withdrawing the tape and noting the height of the wet portion.

Referring to the modification illustrated in Figs. 3 and 4, 10' is a horizontal bar provided with a recess 14' adapted to receive a vertical sliding member 17'. An inverted U-shaped supporting member 18' is mounted on the bar 10' over the sliding member 17'. On the member 10' is located a scale 30 which is subdivided into very small parts, for example, one sixty-fourths of an inch. The sliding member 17' carries guide members 31 so as to enable the steel tape 26' to be mounted thereon alongside the scale 30. The guide members 31 carry thumbscrews 32 whereby the tape 26' may be secured to the sliding member 17'. The tape 26' is provided at its lower end with a bob 28' and an upturned hook 29'.

The operation is as follows: The bar 10' is placed upon the flange of a thief-hole or other opening in the roof of a tank in the manner illustrated in Fig. 1, and the tape 26' is adjusted until the point of the hook 29' is somewhat below the surface of the liquid. The thumbscrews 32 are now tightened so as to secure the tape to the sliding member 17' with its major graduations, for example, the inch marks, in close contact with the small subdivisions on the scale 30. The thumbscrew 20' is now rotated to raise the sliding member 17' until the point of the hook 29' just touches the surface of the liquid. The distance from the surface of the liquid to the zero mark on the scale 30 can now be accurately determined from the reading at one of the inch marks on the scale 26' and the reading on the scale 30 which corresponds thereto.

By the present invention it is possible to obtain accurate readings to the nearest one hundred twenty-eighths of an inch while avoiding the large expense of long steel tapes accurately subdivided to sixty-fourths of an inch.

Although the present invention has been described in connection with the details of certain specific embodiments thereof, it is not intended that such details shall be regarded as limitations upon the scope of the invention except in so far as included in the appended claims.

I claim:

1. A tank gauge comprising a frame, a member adapted to slide therein, said member being provided with a scale, a tape provided with graduation marks, means for attaching said tape to said sliding member in adjustable relation thereto, and a scale on said frame adapted to co-operate with the scale on said sliding member.

2. A tank gauge comprising a frame adapted to be located in a predetermined position on a tank, a member adapted to slide vertically in said frame, a tape, means for securing said tape to said sliding member, and a finely subdivided scale adapted to indicate accurately the vertical distance of a major mark on said tape from a fixed zero point on said frame.

3. A tank gauge comprising a frame adapted to be mounted in a standard position on a tank, a tape, a vertically slidable member in said frame, a vertical measuring member thereon, means on said sliding member for securing said measuring member, and an upwardly projecting member terminating in a sharp point on said measuring member, said vertically slidable member being provided with a finely divided scale for indicating the distance from a major mark on said measuring member to a zero mark on said frame.

4. A tank gauge comprising a frame adapted to be located in a standard position on a tank, a slidable member mounted in said frame for vertical movement, a tape, means for securing said tape to said sliding member, a weight and a member having an upwardly projecting point at the lower end of said tape, said tape having major measuring marks and said slidable member having a scale adjacent said tape provided with marks showing minute distances and adapted to indicate the distance of a major mark of said tape from a zero mark on said frame.

5. A tank gauge comprising a horizontal bar provided with a vertical recess, a member adapted to slide vertically in said recess, a steel tape, clamping members on said sliding member for securing said tape thereto, said tape being provided with major subdivision marks, screw threaded means for accurately positioning said sliding member and a finely subdivided scale on said bar adjacent to said tape and adapted to cooperate with the major marks thereon.

6. A tank gauge comprising a horizontal bar provided with a vertical recess, a member adapted to slide vertically in said recess, a steel tape, clamping members on said sliding member for securing said tape thereto, said tape being provided with major subdivision marks, and a weight and upwardly projecting sharp point at its lower end, screw threaded means for accurately positioning said sliding member, and a finely subdivided scale on said bar adjacent to said tape and adapted to cooperate with the major marks thereon.

JENNINGS B. HAMBLEN.